United States Patent
Kim et al.

(10) Patent No.: US 12,143,696 B2
(45) Date of Patent: Nov. 12, 2024

(54) VIDEO SUMMARIZATION METHOD FOR ENABLING EASY IDENTIFICATION OF RELEVANCE BETWEEN APPEARING OBJECTS IN EVENT

(71) Applicant: ZIOVISION Co., Ltd., Chuncheon-si (KR)

(72) Inventors: Yoon Kim, Seoul (KR); Poo Reum Lee, Chuncheon-si (KR); Hee Cheol Kim, Chuncheon-si (KR); Jung In An, Gangwon-do (KR)

(73) Assignee: ZIOVISION Co., Ltd., Chuncheon-si (KR)

( * ) Notice: Subject to any disclaimer, the term of this patent is extended or adjusted under 35 U.S.C. 154(b) by 0 days.

(21) Appl. No.: 17/766,523

(22) PCT Filed: Aug. 14, 2020

(86) PCT No.: PCT/KR2020/010823
§ 371 (c)(1),
(2) Date: Apr. 4, 2022

(87) PCT Pub. No.: WO2021/075694
PCT Pub. Date: Apr. 22, 2021

(65) Prior Publication Data
US 2023/0336843 A1  Oct. 19, 2023

(30) Foreign Application Priority Data

Oct. 17, 2019 (KR) .......................... 10-2019-0129196

(51) Int. Cl.
*H04N 21/8549* (2011.01)
*G06T 7/20* (2017.01)
(Continued)

(52) U.S. Cl.
CPC .......... *H04N 21/8549* (2013.01); *G06T 7/20* (2013.01); *G06T 7/70* (2017.01); *H04N 21/8456* (2013.01)

(58) Field of Classification Search
CPC .............. G06F 16/739; G06F 16/7837; G06F 3/04842; G06F 16/3341; G06F 16/735;
(Continued)

(56) References Cited

U.S. PATENT DOCUMENTS

| 2016/0070963 | A1* | 3/2016 | Chakraborty | ..... G06F 18/24133 386/241 |
| 2018/0341705 | A1* | 11/2018 | Kim | ..... G06F 16/3341 |
| 2019/0035091 | A1* | 1/2019 | Bi | .......... G06T 7/251 |

FOREIGN PATENT DOCUMENTS

| KR | 10-2011-0105437 A | 9/2011 |
| KR | 10-1289085 B1 | 7/2013 |

(Continued)

OTHER PUBLICATIONS

International Search Report in International Application No. PCT/KR2020/010823, dated Nov. 20, 2020, 3pages.

*Primary Examiner* — Rong Le
(74) *Attorney, Agent, or Firm* — Park, Kim & Suh, LLC

(57) ABSTRACT

The present disclosure relates to a method of creating an original video into a short-time summary video. According to the present invention, a summary video is made by focusing on a dynamic object appearing in an original video, but a plurality of objects appearing in the same time period in the original video are made to appear together in the same time period in the summary video. Accordingly, when an event occurs, there is an advantage in that the relevance between objects in the event may be easily identified.

6 Claims, 14 Drawing Sheets

ORIGINAL VIDEO

SUMMARY VIDEO

(51) Int. Cl.
*G06T 7/70* (2017.01)
*H04N 21/845* (2011.01)

(58) Field of Classification Search
CPC .. G06F 3/0482; G06F 3/0488; G06F 16/4393; G06F 16/5854; G06F 16/7335; G06F 16/743; G06F 16/75; G06F 16/7847; G06F 18/22; H04N 21/23418; H04N 21/8549; H04N 21/23439; H04N 21/431; H04N 1/2145; H04N 1/387; H04N 1/40; H04N 2005/2726; H04N 21/2187; H04N 21/234318; H04N 21/234327; H04N 21/266; H04N 21/41407; H04N 21/4385; H04N 21/44; H04N 21/4788; H04N 21/482; H04N 21/4828; H04N 21/4858; H04N 21/8456; H04N 5/272; H04N 7/183

See application file for complete search history.

(56) References Cited

FOREIGN PATENT DOCUMENTS

| | | | |
|---|---|---|---|
| KR | 10-2018-0056655 A | 5/2018 | |
| KR | 10-2018-0130354 A | 12/2018 | |

\* cited by examiner

Nth FRAME OF ORIGINAL VIDEO        SEPARATION OF DYNAMIC
                                                  OBJECTS

VIDEO SUMMARIZATION METHOD FOR ENABLING EASY IDENTIFICATION OF RELEVANCE BETWEEN APPEARING OBJECTS IN EVENT

CROSS-REFERENCE TO RELATED APPLICATIONS

This application is a National Phase Application of PCT International Application No. PCT/KR2020/010823, which was filed on Aug. 14, 2020, and which claims priority from Korean Patent Application No. 10-2019-0129196 filed on Oct. 17, 2019. The disclosures of the above patent applications are incorporated herein by reference in their entirety.

TECHNICAL FIELD

The present disclosure relates to a video summarization method, and relates to a method of creating a long-time original video into a summary video obtained by summarizing the original video to be within a short time by focusing on an appearing object.

BACKGROUND ART

A video summarization technique is a method of creating a short-time video obtained by being compressed from the original video. When compressing the long-time original video to be the short-time video, it mainly focuses on dynamic objects (people, animals, vehicles) appearing in the original video. For example, when CCTV is installed to maintain public security in an alley with few people, sparse people appear in the original video and most of the time, only the background is continuously photographed. The public security center's concern is the people, not the background. It is uneconomical to have to play the entire original video back again in order to check confirm the people passing the alley in the original video. The original video can be played back at 2× or 3× speed, but it takes a lot of time because the entire original video is played back, and if the playback speed is increased, it becomes difficult to accurately recognize the objects appearing in the video. To solve this problem, the video summarization technique has been proposed.

The video summarization technique is illustrated in FIG. 1. In the original video of FIG. 1, the XY-plane is a video screen, and t is the time axis. When described in units of frames, one XY-plane becomes one video image frame, and frames over time are gathered to create a video. It can be understood as a space-time volume.

In the video summarization technique, first, dynamic objects such as people, animals, and vehicles are recognized from the original video. In FIG. 1, it is assumed that people and bicycles are recognized, and only the background is captured in the middle part of the original video. Among the numerous frames of the original video, only frames in which the dynamic object appears are selected. And after separating only areas where the dynamic object appears in the frames, these areas are combined to create a summary video as illustrated in FIG. 1. Bicycles and passers-by appeared at different times in the original video, but in the summary video, it is expressed that the bicycles and the passers-by appear at the same time. Through the above method, a summary video in which the original video is compressed is created. Meanwhile, in the summary video, the XY-coordinates of the dynamic object are maintained as they are. That is, in the summary video, the appearance time of the object can be moved, but the movement line of the object reflects the reality as it is. If the movement line of the object is reflected as it is, the movement lines of objects appearing at different times may overlap each other. In particular, if passers-by pass through the narrow alleys at different times, the movement lines thereof inevitably overlap a lot. In this case, since the passers-by appear overlapping in the summary video, accurate recognition of the objects may be impossible. Therefore, if an object has a lot of overlapping movement line, the appearance time thereof should be arranged differently in the summary video.

That is, the technical interest in video summarization is about how short the time of the summary video can be made while all the dynamic objects appear in the summary video without being missed out. In other words, it is 'the degree of loss of appearing object' and 'the degree of shortening of time'. Here, the 'loss of appearing object' includes not only the case where an appearing object in the original video do not appear in the summary video, but also the reduction in a recognition rate of the appearing object because the movement lines of appearing objects overlap each other in the summary video.

It will be described with reference to FIG. 2. The X-axis of FIG. 2 represents distance, that is, displacement, and the Y-axis represents time. The left side of FIG. 2 is the original video and the right side is the summary video. In the original video, an object A passed (moved along the X-axis) for a certain period of time around 10:00 AM, and another object B passed around 12:00 AM. The summary video can be made as illustrated in the upper and lower right parts. In the upper figure on the right, the object A and the object B are made to appear at approximately the same time in the summary video in order to shorten the time of the summary video. Although the time required for summarization has been shortened, since the movement lines of the objects A and B are almost identical, the two objects overlap each other in the summary video, which makes accurate recognition difficult. On the other hand, in the summary video below, the recognition rate of objects is increased by arranging the appearance times of the objects A and B with a slight difference. Of course, because of there was the time difference, the time of the summary video is slightly longer than that of the summary video on the upper part.

In summary, the video summarization technique can be summarized as a technique that separates the background and the dynamic object, detects the movement line of the dynamic object, and prevents the movement lines of the objects from overlapping each other so that the objects are made to appear in the summary video but compresses the time as much as possible.

A photograph captured by the summary video created in the above manner is illustrated in FIG. 3. When viewing the lower left corner of a frame photo of FIG. 3, it is possible to view that an object that appeared at 22:29 and an object that appeared at 22:51 in the original video appear together in the summary video. The same is true of the right upper end part. The objects of the original video appear without overlapping movement lines.

However, the conventional video summarization technique focuses only on technical issues of 'loss of object' and 'time compression' and overlooks the matters regarded as the most important point when the video summarization technique is used as a monitoring system for public security and safety in the real world.

The most important thing in the public security monitoring system is "relevance between appearing objects in the event". Videos of passers-by passing peacefully in the alleyways are not of major interest in public security monitoring. Events such as a fight in an alleyway or a person bitten by a dog that suddenly appeared are of major interest. The problem is that the existing video summarization technique focuses only on time compression, and thus the appearance times of people and dogs recognized as dynamic objects can be different from each other in the summary video. For example, in the summary video, a video of a dog running, stopping for a while, and then running again appears, and a shape in which a passer-by passes by at an interval of time, then suddenly stands up and complains of pain appears. If the situation is identified only by viewing the summary video, it will not be able identify the event of the passer-by bitten by the dog at all. Such a conventional technique may be advantageous for shortening the time of the summary video, but it misses an important point. The main matter of interest of the public security monitoring system is the identification of the event and the relevance between the appearing objects in the event. The video summarization technique for enabling easy identification of the event is required.

In addition, the existing video summarization technique does not consider the sequence of appearance times of the objects photographed in the original video in order to shorten the time. The existing video summarization technique considers only the optimal arrangement in which the movement lines of objects do not overlap in order to optimize the time and space of the summary video. Therefore, people who appear late in the original video often appear the earliest in the summary video. For the video summarization, this phenomenon cannot but be tolerated, it is desirable to consider the sequence of appearance times of objects in the original video as much as possible in order to improve the naturalness and quality of the summary video. In particular, this consideration is more meaningful when considering the relevance with the background. When an object that appeared at night in the original video appears during the day in the summary video, the background is different, and thus it is unnatural.

Conventional problems like this are because the existing video summarization technique is only interested in technical matters without considering the actual application environment of the video summarization technique. The video summarization technique is not installed in areas that are very crowded with dynamic objects, such as roads in city centers. The video summarization technique is rather used in a secluded area without many dynamic objects appearing. Areas that are crowded with vehicles and people are places where attention is focused on, and thus a lot of manpower and equipment can be put into the areas. However, the quiet alleyway is not a place where attention is focused, and thus manpower and equipment cannot be put into the alleyway. As a result, from the point of view of public security, the quiet alleyway is arranged in a blind spot. Therefore, safety monitoring is performed by relying on unmanned systems such as CCTV. As a result, in the area where the video summarization technique is applied, there are not many appearing objects, and thus it is effective to focus on the ease of identifying the relevance between the appearing objects in the event described above rather than focusing on time compression. In addition, naturally reflecting the situation of the original video by the summary video is directly related to the excellence of 'quality'. Conventional video summarization technique overlooks this point.

Meanwhile, another problem in the conventional video summarization technique is that an actual phenomenon is expressed unnaturally for the shortening of time) of the summary video. It can also be expressed as a kind of distortion. It will be described with reference to FIG. 4. The right side of FIG. 4 is the original video, and the left side is the summary video. As before, the X-axis represents displacement and the Y-axis represents time axis. In the original video, the object A appears from approximately 300th frame to approximately 1200th frame. During this period, the object A moved from point X1 to point X4. Since the object A was moved for a very long time, the summary video may become too long if summarization is performed as it is. Accordingly, in the prior art, the object A is cut into a plurality of parts A1, A2, and A3 to create a summary video as illustrated on the left side. When viewing the summary video on the left, the same object A appears together at the same time at X1, X2, and X3, respectively. And, the same object A moves together at 3 points for approximately 300 frames. Assuming a long alleyway, a video appears in the form of the same person appearing at the same time at three points along the lengthwise direction of the alley, walking a certain distance, and disappearing together. Although the video is successful in time compression of the summary video, but because it distorts the actual phenomenon, the summary video is inevitably unfamiliar. Even if the video summarization technique and the summary video are operated by an expert, severe distortion of the actual phenomenon causes cognitive discomfort for users. Moreover, since video summarization technique is installed in local governments to maintain public security and is operated by ordinary people, not technical experts, this cognitive discomfort will be greater. In order to increase the usability of video summarization technique, along with shortening of time, technological advances, that can show real-world phenomena without as much distortion as possible, are needed.

DISCLOSURE OF THE INVENTION

Technical Problem

The present disclosure provides a video summarization method that enables an event that occurred between appearing objects photographed in an original video to be easily identified even in a summary video while briefly summarizing the original video.

In addition, the present disclosure provides a method of creating a summary video with improved quality so that a user can naturally accept the summary video by expressing the reality captured in the original video without distortion even in the summary video.

Meanwhile, other objects not specified in the present disclosure will be further considered within the scope that can be easily inferred from the following detailed description and effect of the present disclosure.

Technical Solution

In accordance with an exemplary embodiment of the present invention, a video summarization method includes (a) detecting a plurality of moving objects appearing in an original video composed of a plurality of frames and generating object information including positions and sizes of the objects within the frame, (b) assigning the same ID to an object whose identicalness is recognized among the objects appearing in the plurality of frames, (c) generating a frame set by selecting only frames in which the objects appear in the original video, (d) forming frame volumes each composed of a plurality of frames by dividing the frame set at a preset time interval, and (e) generating a summary video having a shorter playback time than the original video by combining the frame volumes.

Effects of the Invention

The present disclosure provides a method of generating an original video into a summary video with a short time. In the present disclosure, only frames in which dynamic objects appear in the original video are selected to create a frame set, the frame set is divided in units of predetermined time to create frame volumes, and a summary video is generated in units of frame volume.

Accordingly, in the present disclosure, since a plurality of objects appearing together in the frame volume (broadly the original video) also appear in the summary video, it is possible to very easily identify the relevance between the objects in the event when an event occurs.

In addition, by making the appearance of the object coincident with the original video as much as possible in the summary video, the summary video becomes natural and the user's cognitive discomfort can be eliminated.

In addition, in the present disclosure, by allowing a part of an object to be deleted, there is an advantage in that the quality is improved by eliminating the unnaturalness that the same object appears redundantly at the same time by dividing the object and the cognitive inconvenience of the user that occur in the related art.

Meanwhile, it is added that even if the effect not explicitly mentioned herein, the effect described in the following specification expected by the technical features of the present disclosure and its tentative effect is treated as if it was described in the specification of the present disclosure.

Figure 1:
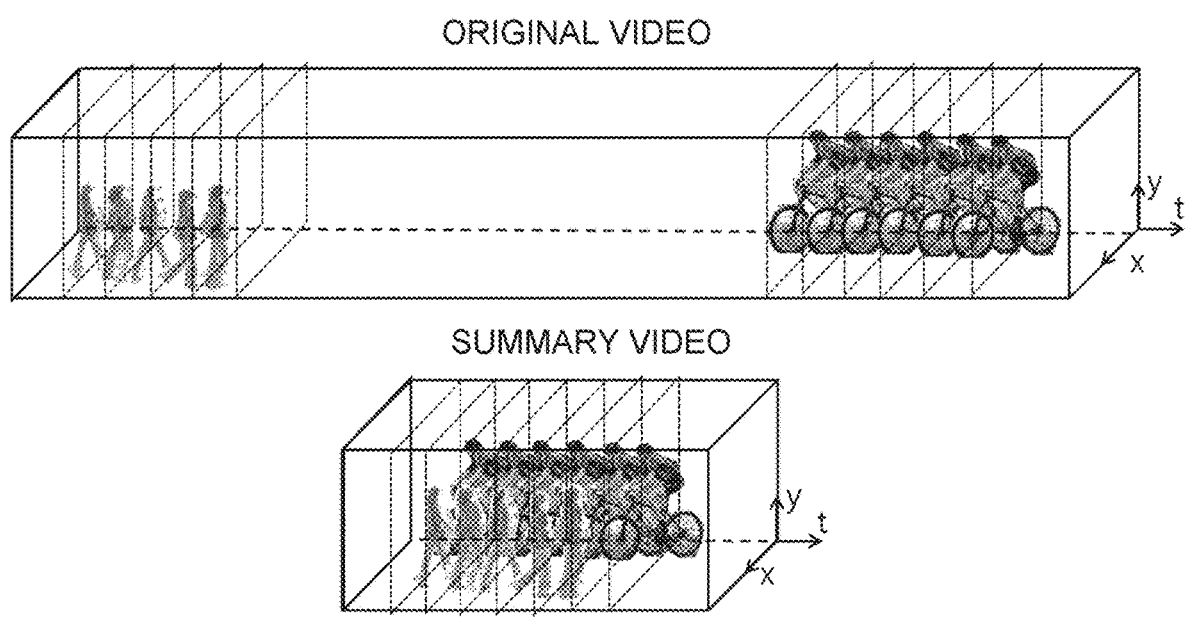
FIG. 1 is a schematic view for describing a video summarization technique.
Figure 2:
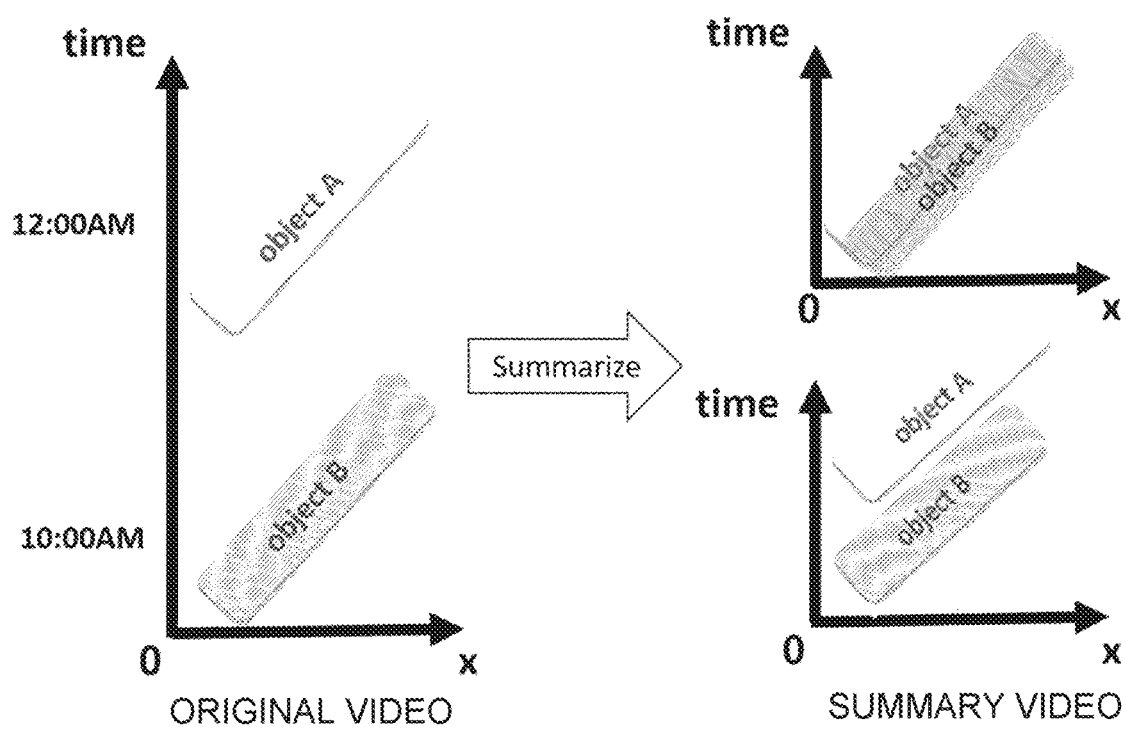
FIG. 2 is a view for describing a process of rearranging appearing objects in an original video in a summary video.
Figure 3:
FIG. 3 is a photo of a completed video summary video.
Figure 4:
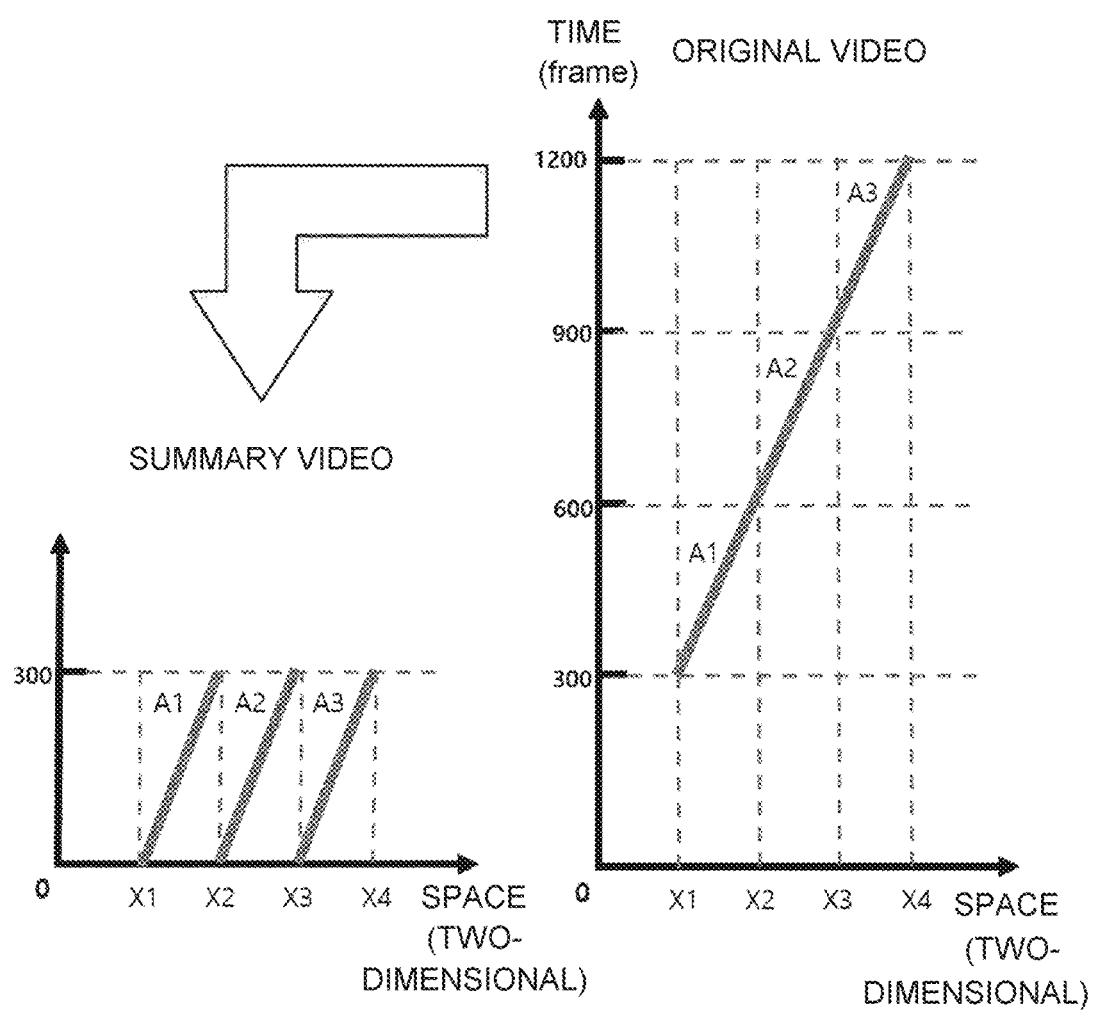
FIG. 4 is a view for describing how to express an actual phenomenon in the summary video by distorting the actual phenomenon for shortening of time.

It is revealed that accompanying drawings are exemplified as a reference for understanding the technical idea of the present disclosure, and the scope of the present disclosure is not limited by the drawings.

BEST MODE FOR CARRYING OUT THE INVENTION

In accordance with an exemplary embodiment of the present invention, a video summarization method includes (a) detecting a plurality of moving objects appearing in an original video composed of a plurality of frames, and generating object information including positions and sizes of the objects within the frame, (b) assigning the same ID to an object whose identicalness is recognized among the objects appearing in the plurality of frames, (c) generating a frame set by selecting only frames in which the objects appear in the original video, (d) forming frame volumes each composed of a plurality of frames by dividing the frame set at preset time intervals, and (e) generating a summary video having a shorter playback time than the original video by combining the frame volumes.

According to the present disclosure, in the generating of the summary video, it is preferable to incorporate any one frame volume of the plurality of frame volumes into the temporary summary video and sequentially incorporate the remaining frame volumes into the temporary summary video according to a predetermined sequence to gradually increase the temporary summary video to create a final summary video, and to compare and judge a degree of overlap of movement lines between appearing objects in the frame volume and the temporary summary video and a degree of shortening of time when the frame volume is incorporated into a previously prepared temporary summary video and determine the time(position of frame(time) axis of temporary summary video) at which each frame volume is to be incorporated into the temporary summary video.

In an example of the present disclosure, when generating the summary video, it is preferable to sequentially incorporate the plurality of frame volumes into the temporary summary video from a first frame volume to a last frame volume after arranging the plurality of frame volumes in a chronological sequence of the original video.

In an example of the present disclosure, when the object appears over a plurality of frame volumes, but appears in any frame volume among the plurality of frame volumes for a certain period of time or less, the corresponding frame volume may be incorporated into the temporary summary video after deleting the object from the corresponding frame volume.

In an example of the present disclosure, in the process of generating the summary video, the frame volume according to a preset time interval is incorporated into the temporary summary video, but a time interval of a unit volume of the frame set may be temporarily changed to be longer or shorter than the preset time interval.

According to the present disclosure, a plurality of objects appearing in the same frame in the original video appear together in the same frame in the summary video so that the relevance between appearing objects in an event is easily identified.

MODE FOR CARRYING OUT THE INVENTION

In the description of the present invention, if it is determined that matters obvious to those skilled in the art with respect to related known functions may unnecessarily obscure the gist of the present invention, detailed description thereof will be omitted.

Hereinafter, a video summarization method according to an example of the present disclosure will be described in more detail with reference to the accompanying drawings.

Figure 5:
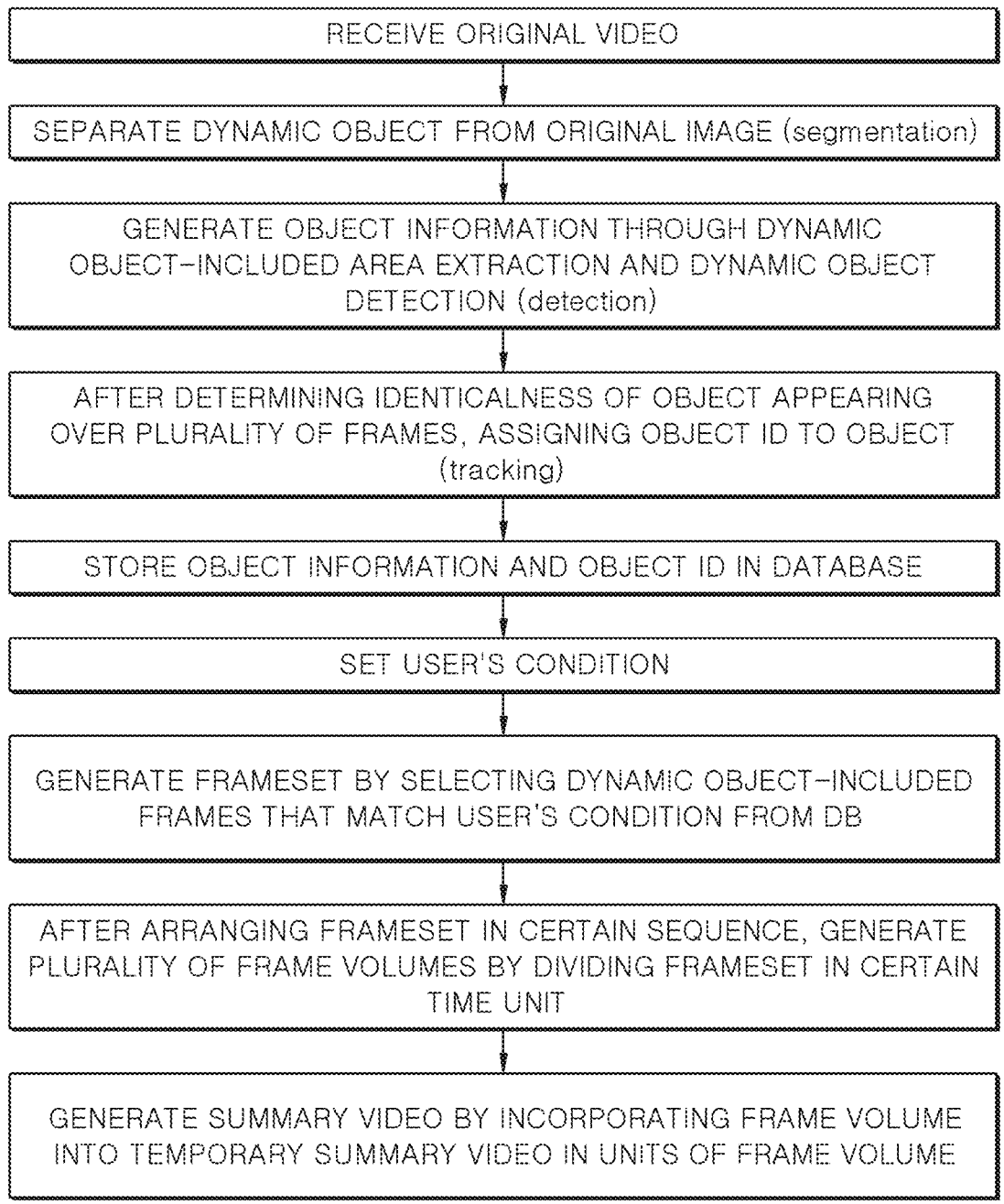
FIG. 5 is a schematic flowchart of a video summarization method in accordance with an exemplary embodiment of the present invention.

FIG. 5 is a schematic flowchart of the video summarization method according to an example of the present disclosure.

Referring to FIG. 5, the video summarization method according to an example of the present disclosure is a method of generating a summary video that briefly summarizes the original video. Here, 'summarization' is performed by focusing on an object appearing in the original video, mainly a dynamic object. That is, most of the frames in which the dynamic object does not appear in the original video are deleted, and the frames appear in the summary video by focusing on the existence of the dynamic object.

The original video serving as the source may be a video of an area requiring safety monitoring using CCTV or the like. It may also be a video of various areas requiring control, such as an airplane runway. Although application of the present disclosure is not excluded in the case of a road densely crowded with vehicles, it may not be suitable for video summarization.

The original video may be downloaded in a way that has already been filmed, or may be received in real time at the same time as photographing in a so-called 'streaming' method.

Figure 6:
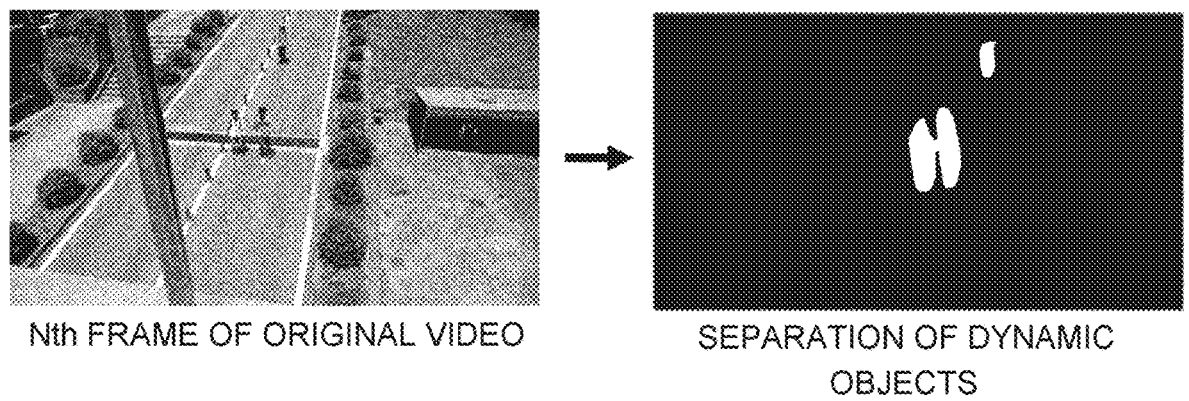
FIGS. 6 and 7 are views for describing a process of separating a dynamic object from the original video and generating object information.

When the original video is received, the dynamic object is detected and separated from each frame (left) of the original video as illustrated in the photo of FIG. 6. The three people who appeared in the Nth frame of the original video are separated from the background as illustrated in the photo on the right.

Figure 7:
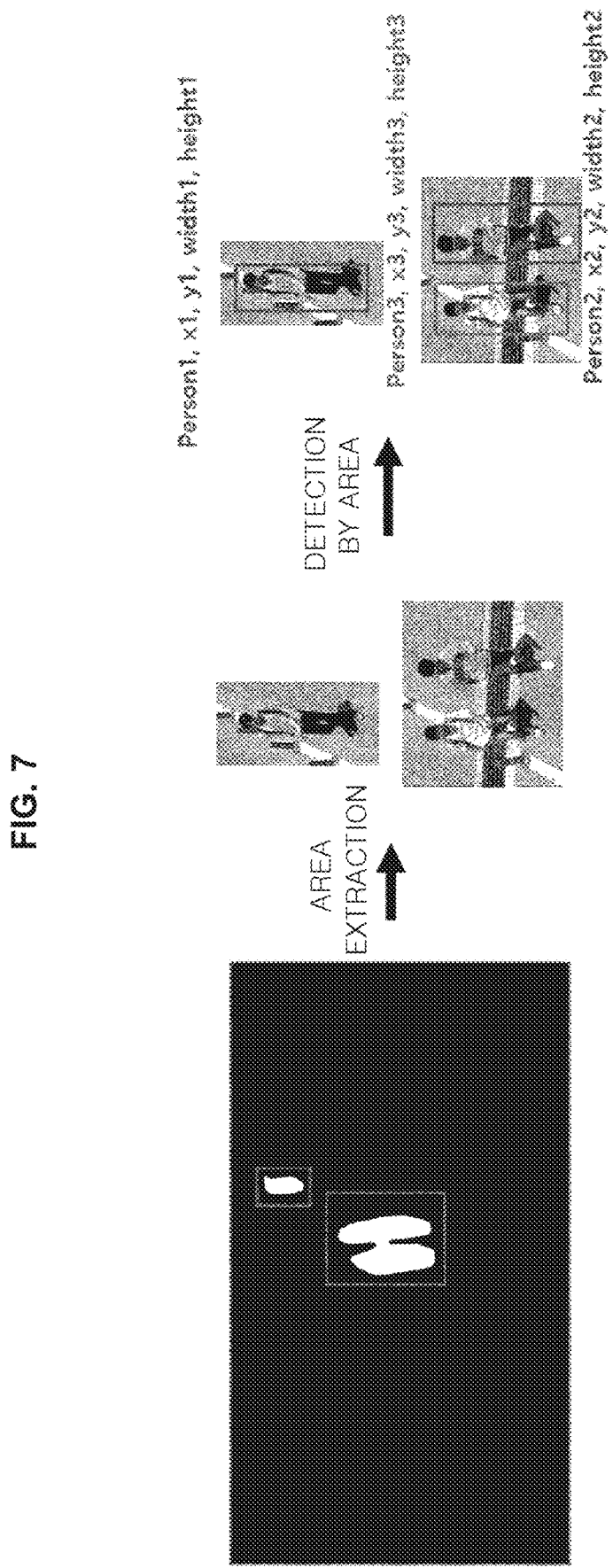

Object information is generated for this separated object. Referring to FIG. 7, first, an area including the dynamic object within a frame is widely extracted, and then information on the corresponding object is detected within the extracted area. The object information includes the coordinates (x, y) in the frame, width and height, and classification of objects such as people, animals, and vehicles. The object information is preset, and may include a color, a movement line direction (from left to right, etc.), etc. The above operation is performed on every frame in which the dynamic object appears.

Figure 8:
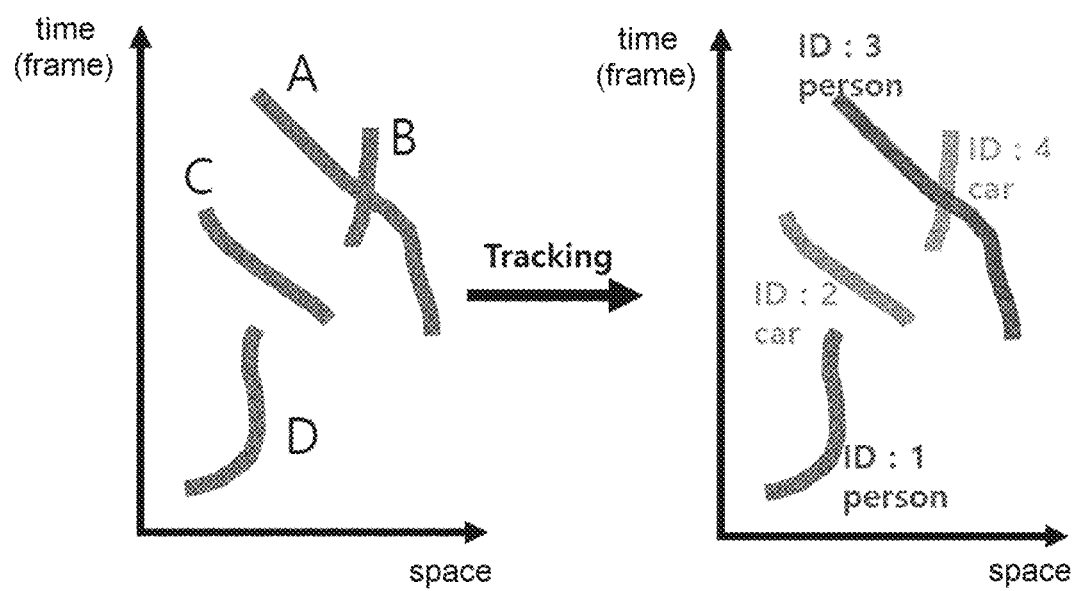
FIG. 8 is a view for describing a tracking process for the dynamic object.
Figure 9:
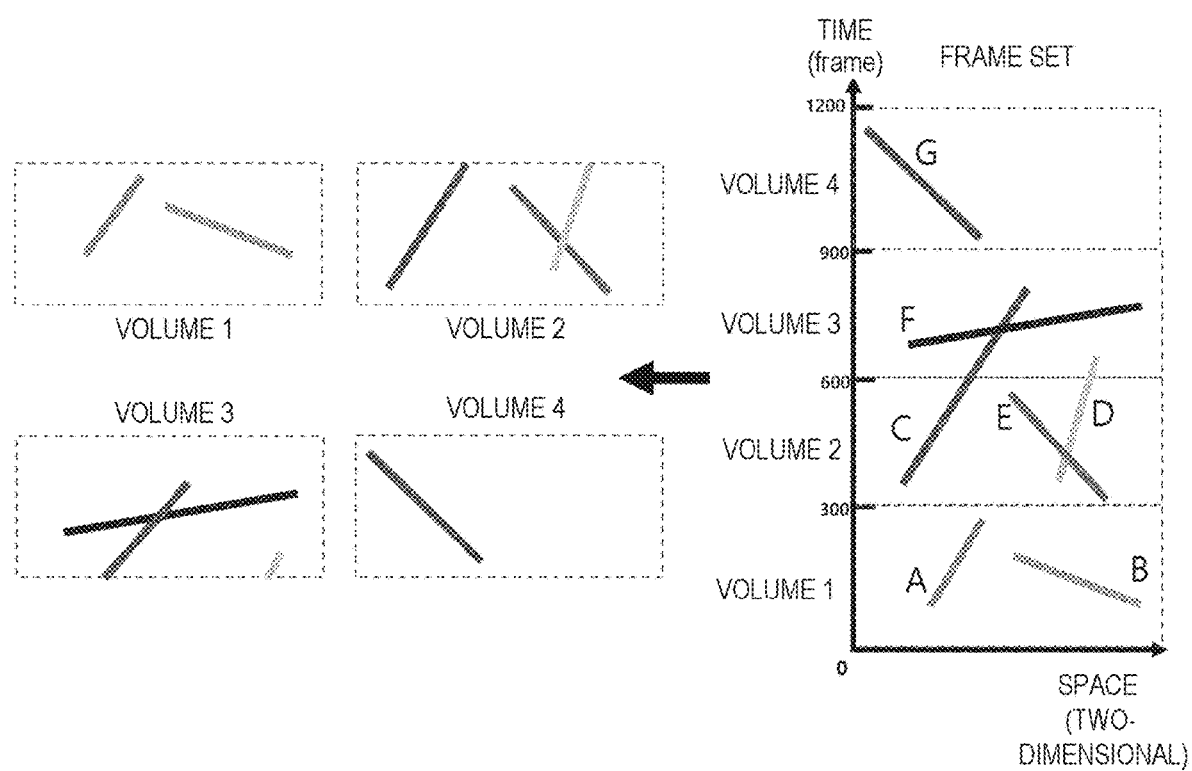
FIG. 9 is a view for describing an algorithm for creating a summary video.

When separation and detection of the object is completed, the identicalness of objects appearing over several frames is determined, and if the objects are determined to be the same object, the same ID is assigned. It will be described with reference to FIG. 8. The left side of FIG. 8 shows the original video. The X-axis represents displacement (assuming that the position within the frame is one-dimensional), and the Y-axis represents time (or frame). That is, a plurality of frames are arranged along the time axis. Unes A to D in the coordinate axis represent dynamic objects. In the case of the object D, it appears first in the original video, and in the case of the object A, it appears later, and appears in the original video for the longest time. Since objects have continuity of movement, it is possible to determine whether or not objects appearing over several frames are identical, by using the frames in which dynamic objects appear or by using object information together. For example, if an object appears in 100 consecutive frames and the continuity of the movement line is confirmed according to the sequence of the frames, it can be regarded as the same object. Also, if examining the object information created for each object appearing in the frame, when the width and height of the objects identified in 100 frames are the same to be fallen within a certain range and there is continuity in the coordinates, the objects can be determined as the same object. As a result of the determination of identicalness, identification IDs are assigned to four objects as illustrated in the figure on the right.

As described above, since the process (segmentation) of separating a dynamic object, the process (detecting) of generating object information by detecting the object, and the process (tracking) of assigning an ID to each object by determining the identicalness are the techniques widely used in the field of video processing such as intelligent CCTV, a detailed description thereof will be omitted.

In addition, the present disclosure does not necessarily have to go through all separation, detection, and tracking, and may generate object information by detecting a dynamic object directly from the frame of the original video without the separation process. Although the present disclosure does not exclude the direct detection of a dynamic object from the original video and the generation of object information, it is preferable to precede the separation process in order to improve speed and accuracy. In addition, the tracking process of determining the identicalness of objects appearing in several frames and assigning an ID to each object can also be performed without the detection process after the separation process, but it is preferable to use the results obtained in the detection process in order to improve accuracy.

In this embodiment, the processing speed and accuracy of a computer processor are improved by sequentially performing the segmentation, detection, and tracking processes.

When the separation, detection and tracking of the dynamic objects for the original video are completed, the object information and object ID are stored in a database, and an identification number (e.g., frame number) of the frame of the original video in which the object appears is also stored in the database.

When data such as object information is stored through analysis of the original video, etc., various summary videos can be created using the data. When a user sets a condition, a summary video is created according to the condition. For example, it is possible to set conditions, such as creating a summary video that shows only vehicles but not people, showing only vehicles that go to the right from among vehicles, or finding only people wearing red clothes. Of course, it is also possible to create the summary video that allows all dynamic objects to appear without any conditions. It is possible to create the summary video according to the user's purpose.

When the condition is set, a frame set that meets this condition is created. That is, a separate frame set is created by selecting only the frames in which the dynamic objects that meet the condition appear among the frames of the original video. For example, assuming that a summary video in which all dynamic objects appear is created, if the original video consists of 100,000 frames and there are 20,000 frames in which the dynamic object appears among the 100,000 frames, only the 20,000 frames are separated and a frame set is created. The dynamic object will appear in every frame included in the frame set.

When the frame set is generated, the summary video is generated. Generating the summary video is the most important feature of the present disclosure and will be described with reference to FIGS. 9 to 12.

FIGS. 9 to 12 are views for describing an algorithm for creating a summary video.

Referring to the figures, a plurality of frame volumes are generated by dividing the frame set, which is set selected by the condition setting, at preset time intervals. In this embodiment, first, the frame set (the right side of FIG. 9) is arranged in chronological sequence of the original video. In addition, the frame set is divided at predetermined time intervals, for example, in units of 300 frames. One divided unit is called a frame volume. When viewing the left side of FIG. 9, it can be seen that the frame set is divided into four frame volumes of volumes 1-4. When separating the four frame volumes, they are illustrated on the left side of FIG. 9.

In the frame set, 6 objects of A to G appear. When viewing the original video, the objects A and B appear first and then disappear. In the case of the object C, the object C moves the space within the frame over approximately 300 to 800 frames. That is, for example, the object C may be assumed as an elderly person with shortened mobility. The object C is moving at a very slow speed. In contrast, in the case of the object F, the object F passes through the space in a very short time. Assuming this space is an alleyway, the object F can be an object such as a motorcycle that passes by quickly.

The objects A, B, E, F, and G appear only within one frame volume. However, the objects C and D appear across a plurality of frame volumes. In this embodiment, the frame volume is not divided in objects(or units of objects), but is divided in a predetermined time(or units of a predetermined time). Of course, it can be adjusted when setting the frame volume time interval according to the characteristics of the object to be monitored. For example, when it is intended to monitor a person, the frame volume time interval may be adjusted so that a person can pass through all the alleys within one volume in consideration of the total length of the alley and the walking speed of the person. When it is intended to monitor motorcycles in the alleyway, it is possible to set the frame volume at a shorter time interval. The meaning of the volume time interval setting will be described later.

Figure 10:
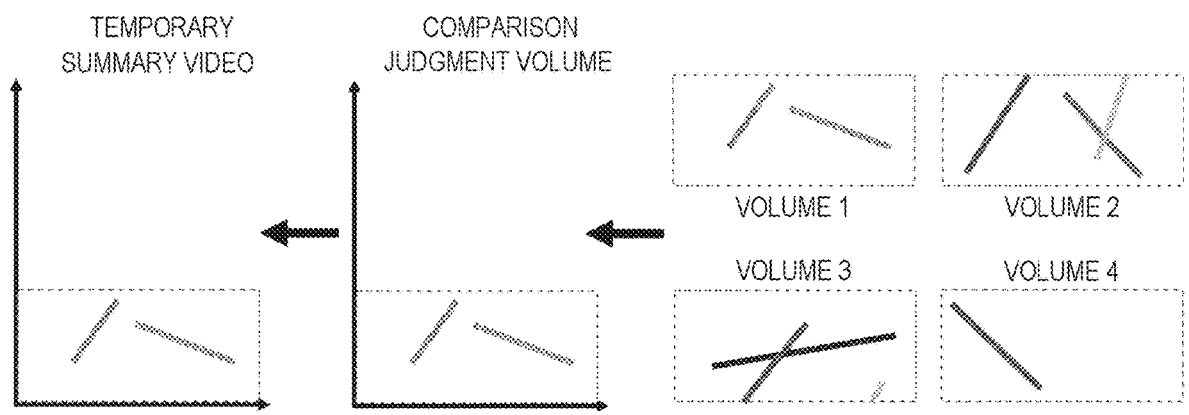
FIG. 10 is a view for describing a process of generating a frame set and dividing the frame set into frame volumes in accordance with the exemplary embodiment of the present invention.

After dividing the frame set into a plurality of frame volumes, a summary video is created in earnest. Referring to FIG. 10, a comparison judgment volume and a temporary summary video are illustrated. In the starting stage, the comparison judgment volume and the summary video are empty. First, one frame volume is selected from among a plurality of frame volumes and set as the comparison judgment volume. The comparison judgment volume is a tentative volume for comparison with the temporary summary video. In this example, volume 1 is selected according to the sequence in the original video and specified as the comparison judgment volume. Between the temporary summary video and the comparison judgment volume, the degree of overlap of movement lines and the degree of time compression of the object should be compared. Such comparative judgment uses a loss function applied in the deep learning field, and a detailed description thereof will be omitted since it is a known technique. However, in the first stage, since the summary video has not yet been created and there is no comparison target, the volume 1 in the comparison judgment volume is incorporated into the temporary summary video as it is. Here, incorporation does not mean that the frame in volume 1 is included in the temporary summary video as it is. Incorporation means the process that extracting some areas (area separated in the previous detection process) containing objects from the volume 1, copying them and pasting them into the temporary summary video. As described above, if the volume 1 is incorporated into the temporary summary video in the first stage, volume 1 becomes the temporary summary video so far.

Figure 11:
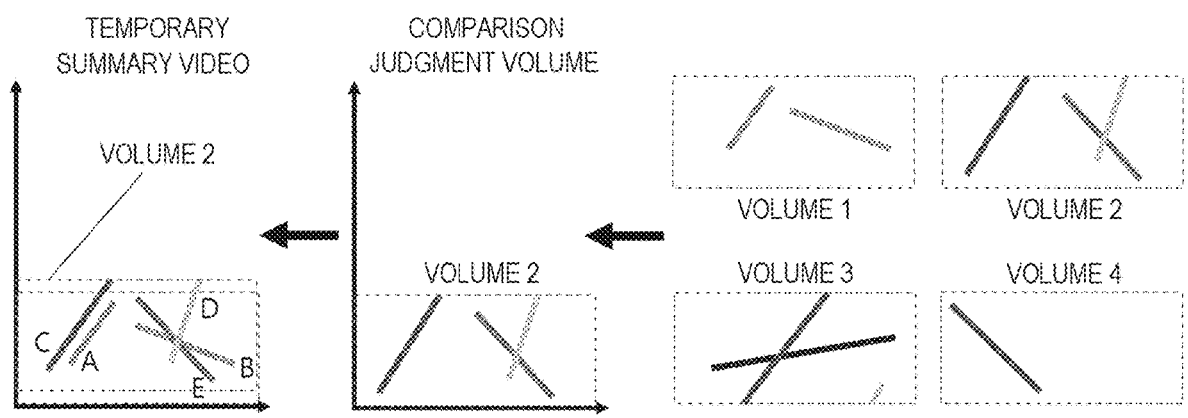
FIG. 11 is a view for describing a process of creating the summary video while updating a temporary summary video.

In the second stage, volume 2 is specified as the comparison judgment volume, and the temporary summary video (its current state is the same as the volume 1) is compared with the volume 2. It is decided in which position the volume 2 is incorporated is advantageous for the degree of time compression and the degree of overlap of movement lines. Referring to FIG. 11, volume 2 was arranged at a slightly higher position (along the Y-axis (time axis)) than the temporary summary video. In other words, the volume 2 was made to appear slightly later than the temporary summary video of current state. When making volume 2 coincident with the previously prepared temporary summary video in time, i.e., making volume 2 and the previously prepared temporary summary video overlap each other, the movement lines of the objects B, D, and E overlap only at one point, and thus the overlap of movement lines is not large. In this case, the volume 2 can be completely overlapped with the volume 1 to shorten the time of the summary video. However, if the time periods of the volume 1 and the volume 2 are completely overlapped, that is, if the volume 2 is shifted to the lowest end, the movement lines of the object A and object C completely overlap, and thus the objects A and C cannot be accurately distinguished in the summary video. In contrast, if the volume 2 is completely separated so that it does not overlap the volume 1 and is arranged above volume 1, the object can be clearly identified, but it is meaningless as video summarization because it does not lead shortening of time. Of course, the time of summary video is shortened itself because the frames in which the dynamic object does not appear, have already been excluded in stage of generating the frame set. But the time of summary video needs to be shortened even further. Therefore, finding the most optimal position (determination of appearance time) for an object or volume to be incorporated is the core of video summarization technique. In this example, as illustrated in FIG. 11, volume 2 is arranged so that there is a slight difference in the appearance times of A and C when the volume 2 is incorporated into the temporary summary video. Since the coordinates (X-axis) of A and C are different in the same time period (Y-axis), it is possible to distinguish between A and C on summary video. In addition, the playback time of the video was much shorter than the combined time of the original volume A and volume B. In the summary video, A and C will be displayed in the form of walking with a small gap. Now, the combined volume of the volume 1 and volume 2 becomes the temporary summary video. That is, whenever one volume is incorporated, the temporary summary video is updated.

In this way, a plurality of volumes are sequentially specified as the comparison judgment volumes, and the volumes are incorporated into the temporary summary video by comparing the degree of overlap of movement lines and the degree of shortening of time of the temporary summary video updated in the previous sequence with those of the specified comparison judgment volume. When the final volume is incorporated into the temporary summary video, the temporary summary video is confirmed as the final summary video.

Figure 12:
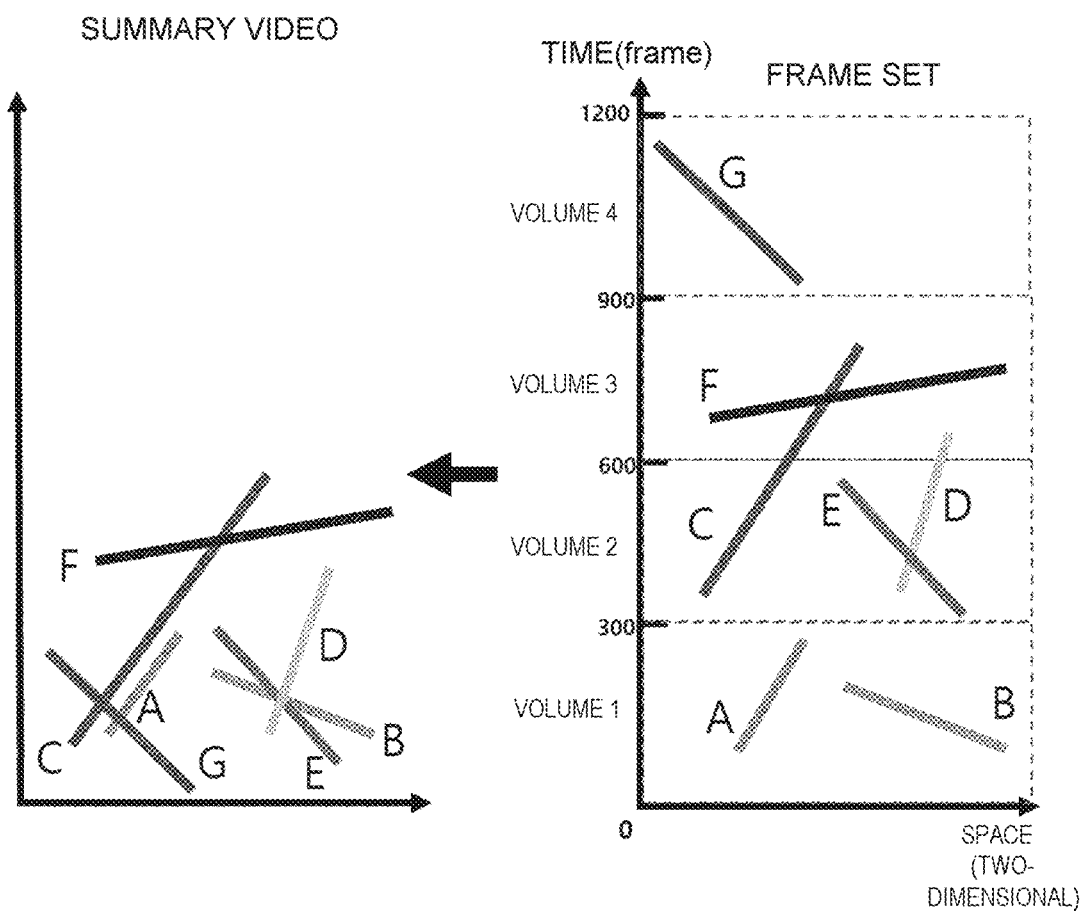
FIG. 12 is a view for showing an example in which the summary video is finally created by continuously updating the temporary summary video.

If all frame volumes in the frame set are incorporated into the temporary summary video by repeating the above process, the summary video is completed as illustrated in FIG. 12. It can be seen that the time of the summary video is shortened than the total time of the frame set. In addition, there is almost no overlap of movement lines between the objects. For example, in the case of the G object, although it is the last object to appear in the original video, the G object appears first in the summary video because the movement line thereof does not overlap with other objects. So it can be seen that the time of summary video is shortened. As such, in the video summarization is a technique for temporally rearranging objects within the summary video in consideration of the movement lines of objects and shortening of time. Here, the meaning of rearrangement means only time, and spatial rearrangement is not performed. The coordinates are implemented in the same manner as the coordinates of the original video.

There are two important points in the present disclosure.

Figure 13:
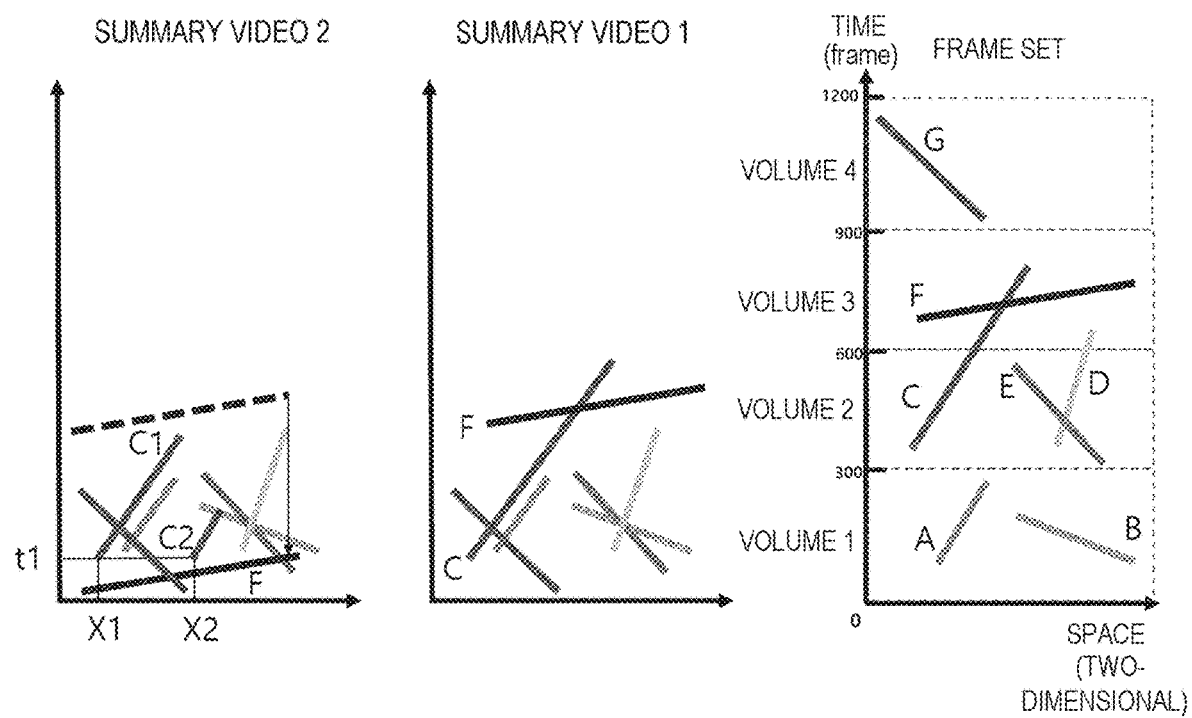
FIG. 13 is a view for comparing an advantage of a method (summary video 1) of generating the summary video in units of frame volume in accordance with the exemplary embodiment of the present invention with a conventional method (summary video 2).

First, the summary video is created in units of volume. Conventionally, the summary video was created in units of individual objects. It will be described with reference to FIG. 13. In FIG. 13, summary video 1 is an example of creating a summary video in units of volume as in the present disclosure, and a summary video 2 is an example of maximizing shortening of time and creating a summary video in units of individual objects. The difference between the summary videos 1 and 2 is the C object and F object. The rest of the objects are the same.

In the summary video 2 of FIG. 13, the F object is arranged at a lower end compared to the summary video 1. In addition, in the case of C object, it is divided into C1 and C2 in the summary video 2. C1 and C2 are the same C object, but the moving speed of C is slow and the appearance time is too long, which interferes with shortening of the time. Accordingly, in the prior art, the summary video 2 was created by dividing the C object into a plurality of pieces according to time. Also in the present invention, such a division method is not excluded. When one object spans a plurality of volumes, the object is divided. Since the degree of space utilization increases when the object is divided, there is an advantage in that the time of the summary video 2 is shortened. However, in the summary video 2, the same object C appears at the time t1 at the point X1 and the point X2 at the same time and walks. Although it is advantageous in terms of shortening of time, it gives inconvenience to the viewer of the summary video 2, because it is different from the reality. The reason for doing this is to shorten time.

Meanwhile, after the C object is separated into C1 and C2 and is moved to the lower end, the F object (dotted line) remains at the upper end, and the F object can be moved to the lower end of the summary video 2 as indicated by the arrow in the summary video 2. In this way, the time of summary video 2 is shortened compared to that of the summary video 1.

But there are problems. In the original video, the object C and object F appear at the same time in the volume 3, and their movement lines overlap each other. Since the summary video 1 to which the present disclosure is applied is summarized in units of volume, a plurality of objects appearing in the same volume (more strictly, the same frame) always appear at the same time period in the summary video. However, in the summary video 2, the object C (C1, C2) and the object F do not appear together at the same time period, but appear at different time periods. For example, if the object C was an old man, the object F was a motorcycle, and there was an event (the point where the movement lines of the motorcycle and the old man meets) where the motorcycle hit the old man in the original video, in the case of the summary video 2, it results in that the actual event in the original video is not reflected at all. If the summary video is created like the summary video 2, the viewer of summary video 2 cannot know actual event at all because the object C and the object F do not appear at the same time of summary video 2. In the summary video 2, the object C (C1, C2) will only appear in the form of going down the road again after falling alone at some time point in pain, and the object F will appear in the form of momentary twitch at some time point and then proceeding again. In the previous example, the C object was divided into C1 and C2, but the same is true for the case where the C object is not divided. In the above example, the same phenomenon occurs even if only the F object is lowered to the lower end without dividing the C object. In the end, if a plurality of objects appearing in the same volume are identified in units of individual objects and the appearance time is changed, the relevance between objects cannot be recognized to viewer of summary video. The events between the two objects are not understood at all. In the utilization of video summarization, the most essential purpose, that is, "event identification," becomes impossible, and results with high shortening of time are derived in terms of technology. This is because the summary video was prepared in units of individual objects.

In contrast, in the summary video 1 according to the present disclosure, the degree of shortening of time is lower than that in the summary video 2, but there is an advantage that the collision event between the C object and the F object can be checked as it is in the summary video. It can be said that the summary video 1 is closer to the essential purpose of the video summarization technique.

The reason that this is made possible in the present disclosure is that the summary video is produced in units of frame volume. Accordingly, the objects appearing at the same time (or at the same volume or at the same frame) in the original video (or frame set) always appear at the same time in the summary video. That is, the production of the summary video in units of frame volume can be defined as "a method of incorporating a plurality of objects into the summary video at the same time by treating the plurality of objects as one set when the plurality of objects appear in the same volume".

In the prior art, even for the objects appearing in the same time period in the original video, since the appearance time in the summary video is rearranged in units of individual objects, the relevance between objects in the summary video may be reduced.

Meanwhile, in the present disclosure, when creating a summary video, a specific frame volume is selected as a comparison judgment volume, and then the summary video is updated by comparing the comparison judgment volume with a pre-edited temporary summary video. In the present disclosure, it is preferred to sequentially specify the frame volume as the comparison judgment volume in the chronological sequence of the original video. Considering the shortening of time and overlap of movement lines, it may be better to select and incorporate frame volumes into the summary video regardless of chronological sequence of the original video. However, it is natural that the chronological sequence of the original video and the sequence of the summary video coincident with each other as much as possible. However, it is added that in the present disclosure, it is not necessary to update the summary video in the sequence of the frame volume according to the time of the original video and the summary video may be produced by using the frame volume with a late time period first.

Meanwhile, the time interval of the frame volume may be variable. When the summary video is created in units of frame volume, the same object may span a plurality of frame volumes, and in the production process, the object is divided. C object previously described is divided into C1 and C2, and thus an unnatural phenomenon may appear. Since the present disclosure adopts the video summary algorithm in units of frame volume, this phenomenon is tolerated. However, in another example of the present disclosure, in order to ensure the natural appearance of the object in the summary video without breaking the principle of volume unit summary production, the time interval of the frame volume may be adjusted. For example, in the frame set of FIG. 13, the objects C and D span volumes 2 and 3. In this case, after integrating the volume 2 and the volume 3 to form one volume, the C, D, E, and F objects appearing in the integrated frame volume can be set as one set. In this way, since the object is not divided, the natural appearance of the object in the summary video is possible. It is determined whether to integrate the volumes or not in this way, after first figuring out how much the loss of degree of time shortening is by applying the loss function. Also, in addition to integrating the frame volume according to a preset time interval, the above process may be performed by arbitrarily adjusting the volume size. The summary video is updated by adjusting the time interval of the frame volume as needed and the time interval of the frame volume is returned to the original time interval, so that the subsequent summary video can be consecutively updated.

Meanwhile, the second of two important points of the present disclosure will be described. This is related to the division of the object described above, that is, the division of C object into C1 and C2. It will be described with reference to FIG. 14. Also in FIG. 14, as described above, according to the present disclosure, volume 1, volume 2, and volume 3 are sequentially incorporated to create the summary video 2. Now it is the stage to incorporate the volume 4 into the summary video 2. When viewing the frame set, the object D spans the volume 3 and volume 4, and the part thereof spanning the volume 4 is called D1. In the summary video 2 created so far, only the part that appeared in the volume 3 of the D object is included. If the volume 4 is arranged at the lower end of the summary video 2 in the summary video 2, there is no problem with the object G, but D1 part completely overlaps the lower end of the object C, and thus the objects C and D are not clearly distinguished in summary video 2. This arrangement is not desirable because of the loss of the degree of overlap. Accordingly, the algorithm calculates the loss function and arranges the volume 4 in a different position, and as a result, the degree of shortening of time is lowered.

Figure 14:
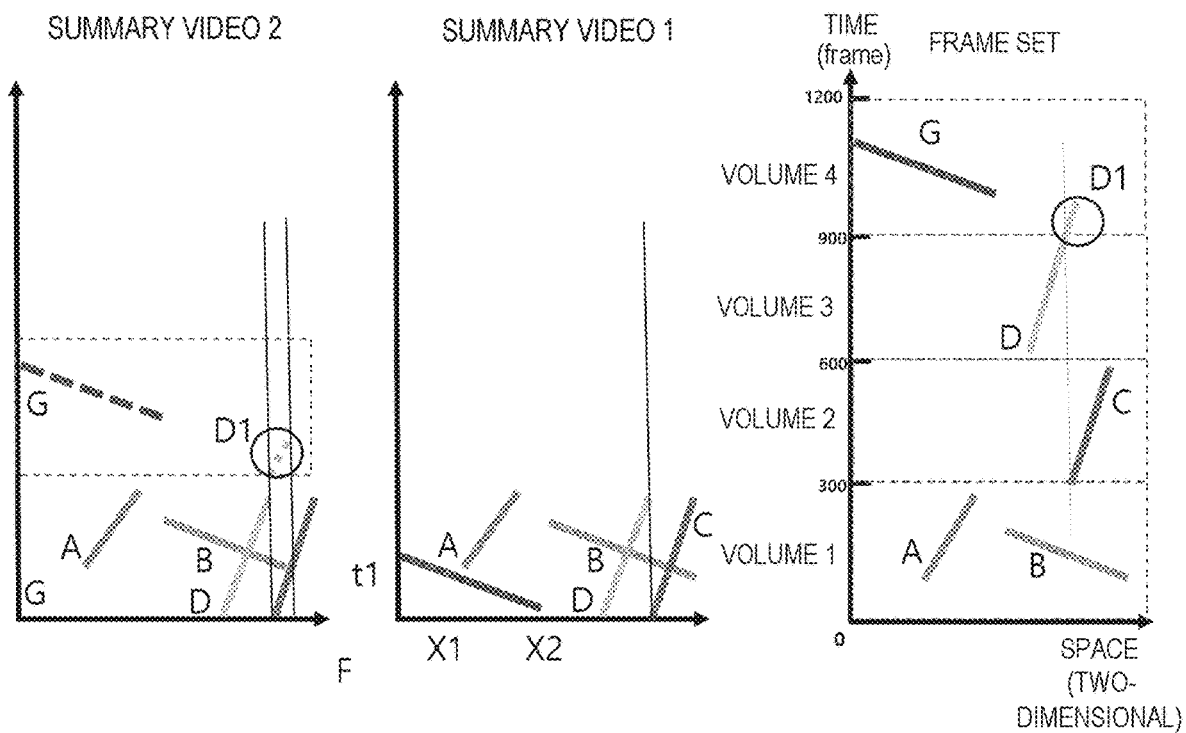
FIG. 14 is a view for describing the shortening of time effect of the summary video according to partial deletion of an object in accordance with the another exemplary embodiment of the present invention.

The present disclosure allows partial deletion of the object as a method for shortening of time. That is, if the same object is hung on a plurality of frame volumes and the movement lines hanging on any one volume is very short compared to the entire movement lines, this part, that is, part D1 in FIG. 14 is deleted. In this case, only the G object remains in the volume 4, and as in the summary video 1, the G object appears at the lower end of the summary video to maximize the shortening of time and minimize the overlap of the movement lines. The criterion that the movement line is short can be set by the user, and even if it is maximum, it should be less than ½ of the total appearance time of the object, preferably ⅓ or less.

One thing to note is that it is desirable that other objects do not appear together in the frame in which the part to be deleted is present. This is because the most important feature of the present disclosure is that a plurality of objects appearing in the same frame also appear in the summary video. In this case, it is possible to delete D1 because D1 and the G object are in the same volume, but they do not appear together in units of frames. However, in order to shorten the time, when a plurality of objects appear in the same frame, the object can be deleted through a special exception. For example, if the probability that an event between objects occurs is low, such as when two objects appear in the same frame but do not approach within a certain distance, or when the appearance time of an object to be deleted is very short, etc., it is possible to maximize shortening of time by allowing a part of the object to be deleted.

So far, the process of generating the summary video in units of frame volume has been described, and the phenomenon has been mainly explained about at what time the frame volume is to be incorporated into the summary video when incorporating the frame volume into the summary video.

The present invention is implemented by a computer, the computer being loaded with software adapted to perform the above algorithm. And the comparison judgment for the degree of shortening of time and the degree of overlap of movement lines is also made by the computer algorithm, which is performed by the aforementioned loss function.

As described above, the present disclosure provides a method of generating an original video into a short-time summary video. In the present disclosure, only frames in which dynamic objects appear in the original video are selected to create a frame set, and frame volumes are created by dividing the frame set in a predetermined time unit. An important feature of the present disclosure is that a plurality of objects appearing together in the frame volume (broadly, the original video) are made to appear together in the summary video, so that when an event occurs, the relevance between the objects can be easily identified.

Also, in the summary video, the appearance of the object is made to coincide with the original video as much as possible, so that the summary video becomes natural and the user's cognitive discomfort can be eliminated.

Also, in the present disclosure, by allowing a part of the object to be deleted, there is an advantage in that the quality is improved by eliminating the unnaturalness and cognitive inconvenience of the user that the same object appears redundantly at the same time by dividing the object as in the related art.

The protection scope of the present disclosure is not limited to the description and expression of the embodiments explicitly described above. In addition, it is added once again that the protection scope of the present disclosure cannot be limited due to obvious changes or substitutions in the technical field to which the present disclosure pertains.

The invention claimed is:

1. A method for generating a summary video for an original video, the method comprising:
   (a) detecting a plurality of moving objects appearing in an original video composed of a plurality of frames and generating object information including positions and sizes of the objects within the frames;
   (b) assigning a same ID to an object whose identicalness is recognized among the objects appearing in the plurality of frames;
   (c) generating a frame set by selecting only frames in which the moving objects appear in the original video;
   (d) forming frame volumes each composed of a plurality of frames by dividing the frame set at a preset time interval; and
   (e) generating a summary video having a shorter playback time than the original video by combining the frame volumes, wherein
   in the generating of the summary video,
   any one frame volume of the plurality of frame volumes is incorporated into a temporary summary video, and the remaining frame volumes are sequentially incorporated into the temporary summary video according to a predetermined sequence to gradually increase the temporary summary video to create a final summary video, and a degree of overlap of movement lines of moving objects appearing in each frame volume and the temporary summary video and a degree of shortening of time are compared and judged when each frame volume is incorporated into a previously prepared temporary summary video, and an optimal position at which each frame volume is incorporated into the temporary summary video is determined based on the comparison, wherein the movement lines of the moving objects represent moving paths of the moving objects in an X-Y plane having an X-axis representing displacement and a Y-axis representing time.

2. The method of claim 1, wherein when generating the summary video, the plurality of frame volumes are sequentially incorporated into the temporary summary video from a first frame volume to a last frame volume after arranging the plurality of frame volumes in a chronological sequence of the original video.

3. The method of claim 1, wherein when the object appears over a plurality of frame volumes, but appears in a short time such that a time during which the object appears in any frame volume among the plurality of frame volumes is less than a predetermined ratio compared to a total appearance time, the corresponding frame volume is incorporated into the temporary summary video after deleting the object from the corresponding frame volume.

4. The method of claim 1, wherein in the generating of the summary video, the frame volume according to the preset time interval is incorporated into the temporary summary video, but a time interval of a unit volume of the frame set is temporarily changed to be longer or shorter than the preset time interval.

5. The method of claim 1, wherein a plurality of objects appearing in the same frame in the original video appear together in the same frame in the summary video.

6. An apparatus for generating a summary video for an original video, the apparatus comprising a hardware processor configured to:

detect a plurality of moving objects appearing in an original video composed of a plurality of frames and generate object information including positions and sizes of the objects within the frames;

assign a same ID to an object whose identicalness is recognized among the objects appearing in the plurality of frames;

generate a frame set by selecting only frames in which the moving objects appear in the original video;

form frame volumes each composed of a plurality of frames by dividing the frame set at a preset time interval; and generate a summary video having a shorter playback time than the original video by combining the frame volumes, wherein any one frame volume of the plurality of frame volumes is incorporated into a temporary summary video, and the remaining frame volumes are sequentially incorporated into the temporary summary video according to a predetermined sequence to gradually increase the temporary summary video to create a final summary video, wherein a degree of overlap of movement lines of moving objects appearing in each frame volume and the temporary summary video and a degree of shortening of time are compared and judged when each frame volume is incorporated into a previously prepared temporary summary video, and an optimal position at which each frame volume is incorporated into the temporary summary video is determined based on the comparison, wherein the movement lines of the moving objects represent moving paths of the moving objects in an X-Y plane having an X-axis representing displacement and a Y-axis representing time.

* * * * *